US007862711B2

(12) United States Patent
Han

(10) Patent No.: US 7,862,711 B2
(45) Date of Patent: Jan. 4, 2011

(54) BIOFILTER UNITS AND WATER TREATMENT FACILITIES WITH USING THE SAME BIOFILTER UNITS

(75) Inventor: Sang Bae Han, Yongin-si (KR)

(73) Assignee: Green Technology Co., Ltd. (KR)

(*) Notice: Subject to any disclaimer, the term of this patent is extended or adjusted under 35 U.S.C. 154(b) by 173 days.

(21) Appl. No.: 11/815,689

(22) PCT Filed: Apr. 21, 2006

(86) PCT No.: PCT/KR2006/001507

§ 371 (c)(1), (2), (4) Date: Aug. 7, 2007

(87) PCT Pub. No.: WO2007/102639

PCT Pub. Date: Sep. 13, 2007

(65) Prior Publication Data

US 2010/0133156 A1 Jun. 3, 2010

(30) Foreign Application Priority Data

Mar. 8, 2006 (KR) ...................... 10-2006-0021780

(51) Int. Cl.
*C02F 3/06* (2006.01)

(52) U.S. Cl. ....................... 210/151; 210/251; 210/320; 210/521; 210/615

(58) Field of Classification Search ................. 210/150, 210/151, 251, 294, 320, 322, 521, 615, 617
See application file for complete search history.

(56) References Cited

U.S. PATENT DOCUMENTS 2,458,163 A * 1/1949 Hays .......................... 210/151
4,045,344 A * 8/1977 Yokota ....................... 210/151
4,190,543 A * 2/1980 Pederson et al. ............ 210/151
4,859,321 A * 8/1989 Iida ........................... 210/150
4,929,349 A * 5/1990 Beckman .................... 210/151
5,228,983 A * 7/1993 Nims ......................... 210/151
5,316,668 A * 5/1994 Tang .......................... 210/151
5,389,247 A * 2/1995 Woodside ................... 210/151
5,500,112 A * 3/1996 McDonald .................. 210/151
6,030,529 A * 2/2000 Biskner et al. .............. 210/521
6,942,788 B1 * 9/2005 Cox et al. .................. 210/151
2004/0245173 A1 * 12/2004 Johnson et al. ............. 210/150

FOREIGN PATENT DOCUMENTS

KR 10-1999-000593 A 1/1999
KR 10-1999-0046204 A 7/1999
KR 10-2000-0021219 A 4/2000
KR 10-2001-0047781 A 6/2001

* cited by examiner

*Primary Examiner*—Christopher Upton
(74) *Attorney, Agent, or Firm*—Rodman & Rodman

(57) ABSTRACT

Wastewater treatment facilities having biofilm contact and solid-liquid separation functions are disclosed, wherein a biofilter unit having biofilm contact, inclination plate precipitation and de-filming functions comprises an inclination plate settler formed with a plurality of inclination plates (2), each plate spaced in parallel relative to water surface at a predetermined downward angle and a predetermined distance apart, and spacings formed by the plates (2) are filled by biofilm media (3,3*a*) formed with specific surface-increased and bio-affinity materials so that micro-organisms can attach and grow in the shapes of biofilms therein, and de-filming means for separating biofilms attached to and grown on the biofilm media (3, 3*a*) and solids deposited on the surfaces of the inclination plates (2) by applying shearing force to biofilm media (3, 3*a*) and inclination plates (2).

8 Claims, 6 Drawing Sheets

BIOFILTER UNITS AND WATER TREATMENT FACILITIES WITH USING THE SAME BIOFILTER UNITS

TECHNICAL FIELD

The present invention relates to water treatment facilities wherein required facilities are small and the facilities are capable of economically separating solids (solid particles) contained in wastewater and reservoirs, and biologically decomposing dissolved organic materials as well.

BACKGROUND ART

A gravity type settler is largely used for wastewater treatment facilities, water purifying facilities and solid-liquid separating systems for separating solids contained in liquids in a solid-liquid separating process. However, although the gravity type settler can extensively remove solids of larger particle sizes and heavier specific gravities, the settler suffers from a number of shortcomings that make it inefficient, for example but not limited thereto, in removing smaller particulates and requiring a large facility.

The conventional inclined plate-type settler employed for the gravity type settler is economical in terms of required facility. However, the conventional settler still suffers from a number of shortcomings that make it insufficient, particularly in removing fluidized particulates and dissolved organic materials because it is equipped only with a solid-liquid separating function.

The conventional biofilter equipped with biofilm contact and filtration functions has advantages of simultaneously performing solid-liquid separating and dissolved organic material decomposing functions, whereas the biofilter also has a disadvantage of difficulty in being adapted to treatment of wastewater having a high solid concentration. The biofilter further has a disadvantage in that it is mainly disposed at a rear end of a gravity type settler for treatment of supernatant having a low solid concentration such that a large facility is required and a head loss is high.

DISCLOSURE

Technical Problem

The present invention is disclosed to solve the afore-mentioned problems and it is an object to provide biofilter units and water treatment facilities using the same biofilter units, wherein the biofilter unit is formed with de-filming means for separating solids from inclined plates and fixed biofilm media by applying shearing force to biofilms attached and grown on the fixed biofilm media and solids deposited on surfaces of the inclined plates, such that solid-liquid separating function and biological decomposing function of organic materials can be simultaneously performed, thereby allowing the present invention to be applied to disposal of wastewater of high solid concentration, and separate additional facilities and structures are not needed to be easily applied to the conventional gravity type settler.

Technical Solution

A biofilter unit according to the object of the present invention comprises: an inclined plate settler formed with a plurality of inclined plates, each plate spaced in parallel relative to water surface at a predetermined downward angle and a predetermined distance apart; and biofilm media formed with specific surface-increased and bio-affinity materials for micro-organisms formed in spacings between the inclined plates to attach to and grow thereon.

The biofilm media may comprise at least one or more of fixed biofilm media and fluidized biofilm media, where the fixed biofilm media includes porous resin mats so expanded as to allow voids to communicate therebetween, fiber-interwined sponge-like meshy mats, porous ceramic materials, porous activated carbon materials, weavings formed with cilia on at least one surface thereof or non-woven fabrics and suspended microorganism contact materials having lots of densely-woven fabric or ring-shaped cotton protrusions on ropes, and the fluidized biofilm media includes synthetic resin formations, expanded resins, granular activated carbons, granular porous ceramics and fine thread balls formed by fine threads.

The inclined plates and the biofilm media may be formed by one side smoothened plated media in which one side has a smooth surface on which solids can easily move and the other side is a porous biofilm medium on which micro-organisms can be attached and grown.

Furthermore, the biofilter unit may be formed with de-filming means comprising: an agitator for generating agitating water currents for separating solids from inclined plates and biofilm media by applying shearing force to biofilms attached and grown on the biofilm media and solids deposited on surfaces of the inclined plates; a combination unit composed of diffusers for ejecting air bubbles and a blower; a combination unit composed of an ejector and a pump for ejecting water currents and air bubbles at the same time; and a combination unit of a nozzle and a pump for ejecting water currents or an ultrasonic oscillator for generating ultrasonic waves.

Still furthermore, the biofilter unit may be comprised of a wastewater treatment facility located at a reactor or a settling chamber for removing solids and inorganic materials collected in supernatant, or for reducing both contaminants and solids effluent into a subsequent reactor and a settling chamber.

Still furthermore, a wastewater treatment facility may be formed with a biofilter unit located an upper side of a reactor where sludge blanket is formed therein or biological or physiochemical reaction occurs, and a wastewater treatment facility may be further added by treatment function where the reactor is filled at a spacing thereunder with biofilm media so that the treatment function can be performed by micro-organisms attached and grown on the biofilm media.

ADVANTAGEOUS EFFECTS

According to the present invention, the biofilter unit can be embodied without limit that is capable of treating wastewater of high solid concentration by equipping with both a biologically decomposing function of organisms using biofilm media and a solid separating function using inclined plate settling facility.

The biofilter unit can be combined with a gravity type settler or a reactor to realize various types of economical and effective water treatment facilities requiring smaller facilities and capable of removing solids and dissolved organic materials at the same time.

BEST MODE

Figure 1:
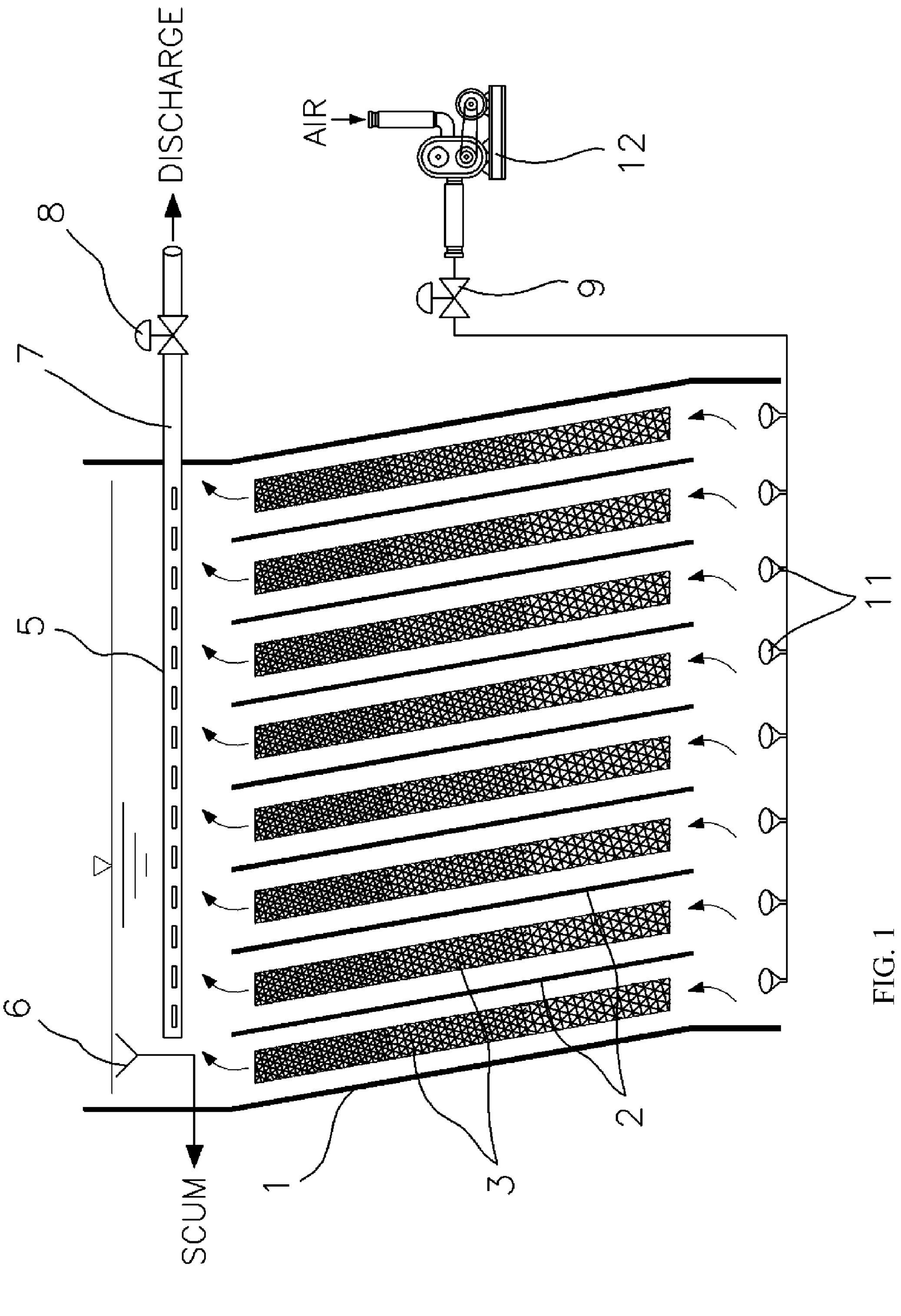
FIG. 1 is a conceptual drawing of a biofilter unit according to a first embodiment of the present invention.

FIG. 1 is a conceptual drawing of a biofilter unit according to a first embodiment of the present invention.

The biofilter unit according to the first embodiment of the present invention comprises: an inclined plate settler formed with a plurality of inclined plates (2), each plate (2) spaced in parallel relative to the surface of water at a predetermined downward angle and a predetermined distance apart; and biofilm media (3) formed with specific surface-increased and bio-affinity materials for micro-organisms formed in spacings between the inclined plates (2) to attach thereto and grow thereon.

The biofilm media may comprise at least one or more of fixed biofilm media and fluidized biofilm media, where the fixed biofilm media includes porous resin mats so expanded as to allow voids to communicate therebetween, fiber-interwined sponge-like meshy mats, porous ceramic materials, porous activated carbon materials, weavings formed with cilia on at least one surface thereof or non-woven fabrics and suspended microorganism contact materials having lots of densely-woven fabric or ring-shaped cotton protrusions on ropes, and the fluidized biofilm media includes synthetic resin formations, expanded resins, granular activated carbons, granular porous ceramics and fine thread balls shaped in rectangles by fine threads.

Voids at the clarified effluent outlet side of the biofilm media (3) are more densely prepared than those at influent water inlet side to thereby enhance the specific surface and to increase the contact frequency between contaminant materials and the biofilm media (3) because the influent water decreases in contaminant concentration thereof as contact with the fixed biofilm media (3) is progressed.

The biofilter unit (1) may be formed with de-filming means for separating solids from the inclined plates (2) and biofilm media by applying shearing force to biofilms attached and grown on the biofilm media and solids deposited on surfaces of the inclined plates.

The de-filming means may include at least one or more of an agitator for generating agitating water currents, a combination unit of diffusers for ejecting air bubbles and a blower, a combination unit of an ejector for ejecting water currents and air bubbles at the same time and a pump, and a combination unit of a nozzle for ejecting water currents and a pump, and an ultrasonic oscillator for generating ultrasonic waves, and de-filming means combined with diffusers (11) and a blower (12) is exemplified in the present embodiment.

The effluent water may become turbid and contaminated by separated solids if the blower (12) is activated to implement the de-filming from the inclined plates (2) and the biofilm media (3) via the diffusers (11). Therefore, the clarified effluent outlet (7) is disposed with passage adjusting means (8) in order to prevent or minimize the discharge of the solids to an outside from an onset of activation of the de-filming means to a time when the de-filming is completed and the separated solids are precipitated and stabilized.

The passage adjusting means (8) may be a pneumatic valve operable by air supplied from the blower (12) operating the de-filming means such that, when the blower (12) is operated for de-filming, or to open a valve for de-filming, the passage adjusting means (8) is operates to prevent or minimize the discharge of the solids during the de-filming process. The conventional method of passage adjusting means including an inlet valve and an electric valve may be used without any limitation.

Furthermore, scum overflow weir (6) for separating and removing scum floating on the water surface in the biofilter unit (1) may be disposed to prevent or minimize the treated water contamination caused by scum overflow.

Although a perforated submerged orifice (5) functioning as treated water collecting means for collecting the supernatant and flowing toward the clarified effluent outlet (7) is exemplified in the present embodiment, it is not limited thereto but various other types of collecting means such as V-notch weir, trench type weir and the like may be employed.

Figure 2:
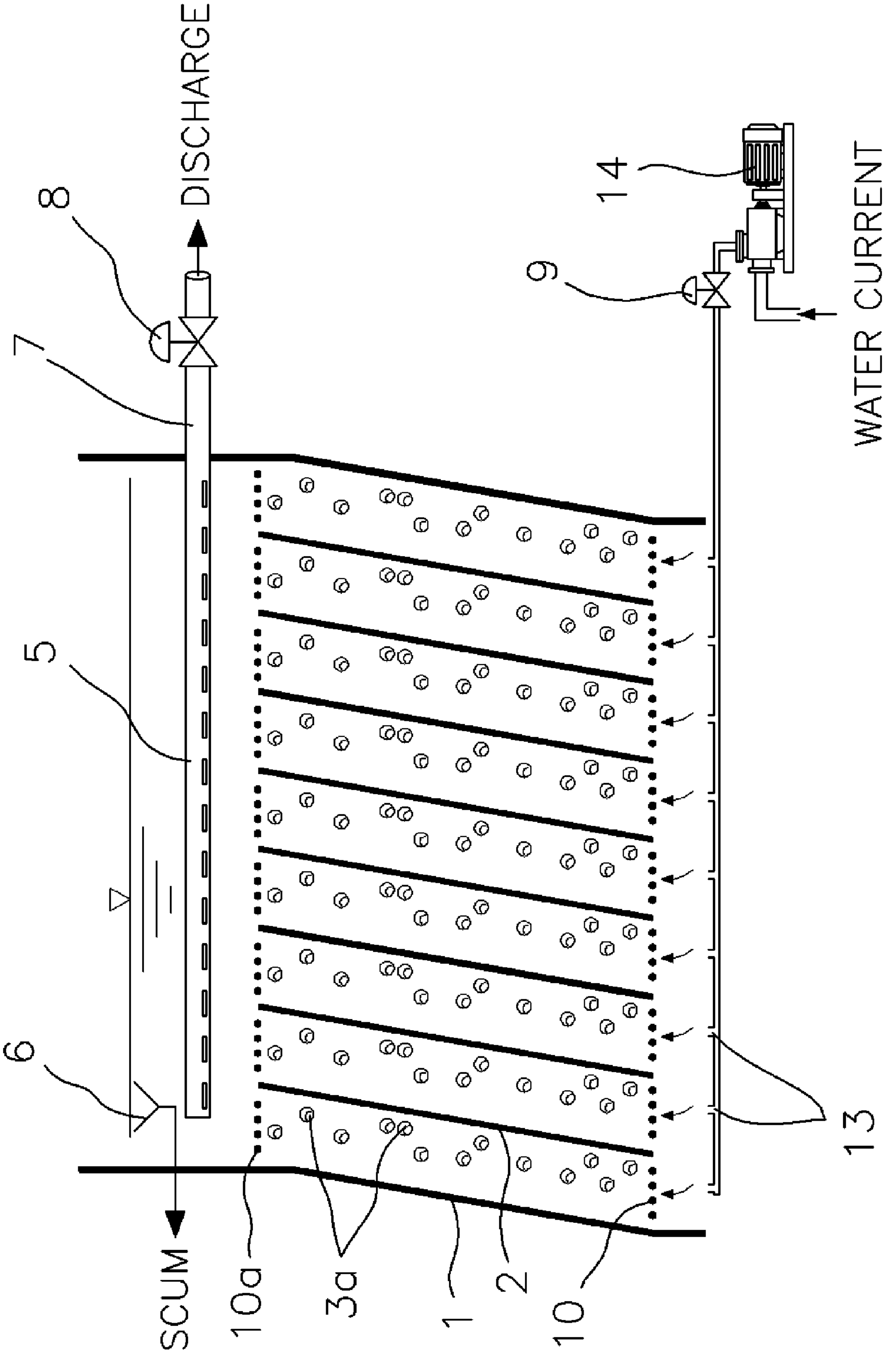
FIG. 2 is a conceptual drawing of a biofilter unit according to a second embodiment of the present invention.

FIG. 2 is a conceptual drawing of a biofilter unit according to a second embodiment of the present invention.

The second embodiment relates to at least one of the fluidized biofilm media (3*a*) filled in spacing of the inclined plates (2), where the fluidized biofilm media includes synthetic resin formations so combined as to have a large specific surface, expanded resins cut to appropriate sizes for fluidization, granular activated carbons, granular porous ceramics and fine thread balls formed in shapes of rectangles by fine threads.

Unlike the fixed biofilm media, the fluidized biofilm media (3*a*) may precipitate downward or float upward to be washed away outside of the inclined plates. Therefore, meshed bodies (10, 10*a*), each square interstice of which being smaller than each particle diameter in the fluidized biofilm media (3*a*), are installed at upper and lower openings of the inclined plate-type settler in order to prevent the wash-out of the fluidized biofilm media (3*a*).

Alternatively, the mesh body (10) may be disposed only at the lower side of the inclined plate-type settler, while the upper side is disposed with a perforated submerged orifice (5) whose outlets are smaller than the particle diameters in the fluidized biofilm media (3*a*) to thereby replace the mesh body (10*a*) of the upper side.

Although de-filming means combined with a pump (14) and a nozzle (13) for ejecting water currents was exemplified in the present embodiment, the passage adjusting means (8) may be operated by employing water pressure supplied from the pump (14).

Figure 3:
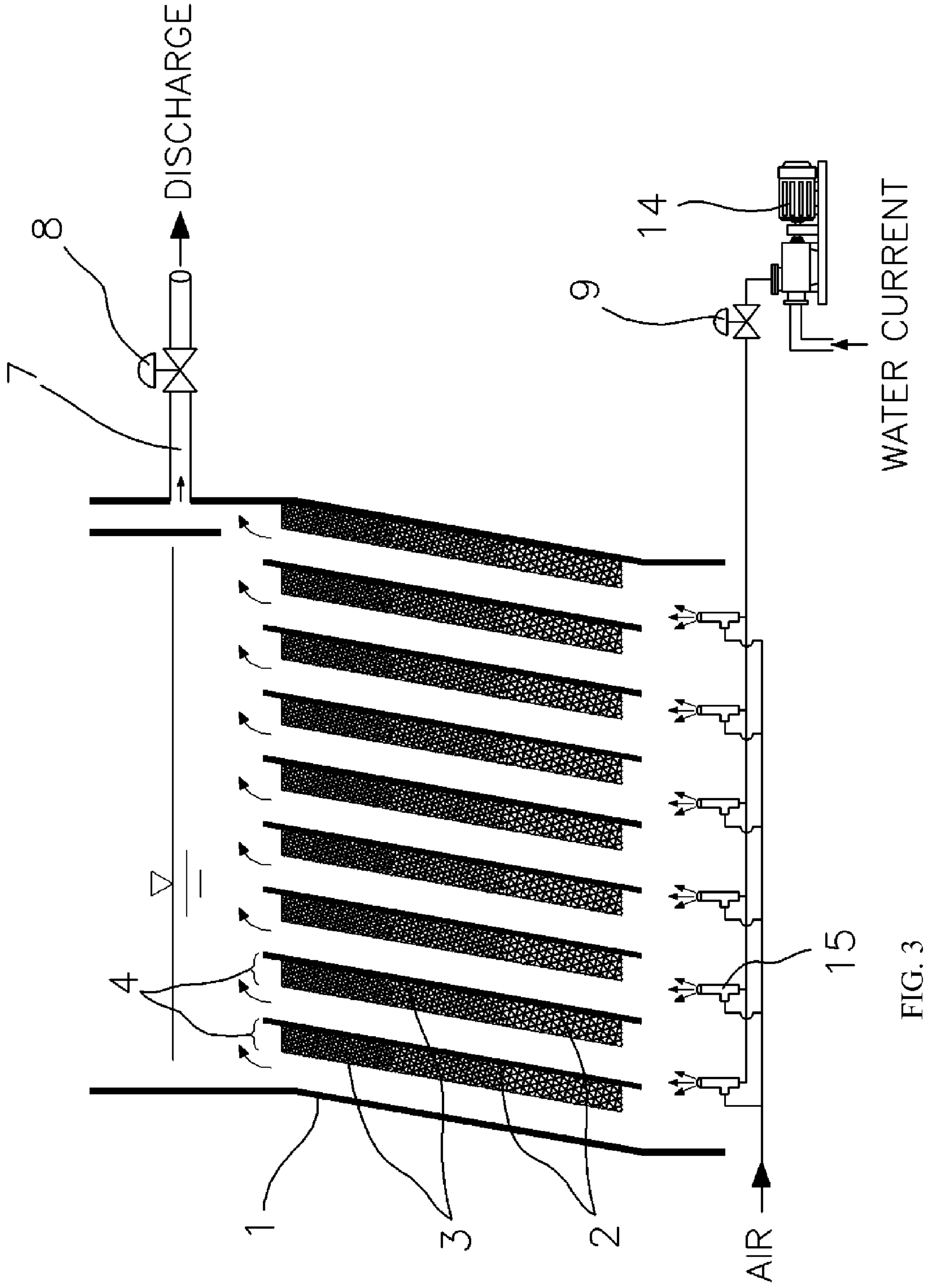
FIG. 3 is a conceptual drawing of a biofilter unit according to a third embodiment of the present invention.

FIG. 3 is a conceptual drawing of a biofilter unit according to a third embodiment of the present invention, where each inclination inclined plate (2) and fixed biofilm media (3) are contacted at either any one side thereof, and where one side has a smooth surface on which solids can easily move while the other side is comprised of a one-side smoothened plated media (4) attached with porous biofilm media which microorganisms can grow on and be attached to. In other words, the one-side smoothened plated media (4) may be so constructed as to have one side of the inclined plate (2) attached by the porous biofilm media (3), or may be one side of the porous plated biofilm media one side of which is processed with a smooth slick surface.

Furthermore, the present embodiment has exemplified de-filming means comprised of a pump (14) and an ejector (15), where the biofilter unit (1) is so constructed as to form a de-filming structure, wherein when a pump (14) is operated, an ejector (15) sucks in air, and air bubbles and water currents are ejected to the inclined plates (2) and the fixed biofilm media (3) to implement the de-filming process.

The inclined plate-type settlers according to the first, second and third embodiments of the present invention may be constructed in such a manner that the inclined plates have a latticed array, or are slantingly overlapped by a plurality of round pipes or angled pipes, each cross-section thereof being of angled or inclined pipe, and the inclined pipe being filled therein with biofilm media.

Although the biofilter unit (1) is exemplified by way of an upstream type inclined plate-type settler, a horizontal inclined type settler may be limitless used for the biofilter unit.

Figure 4:
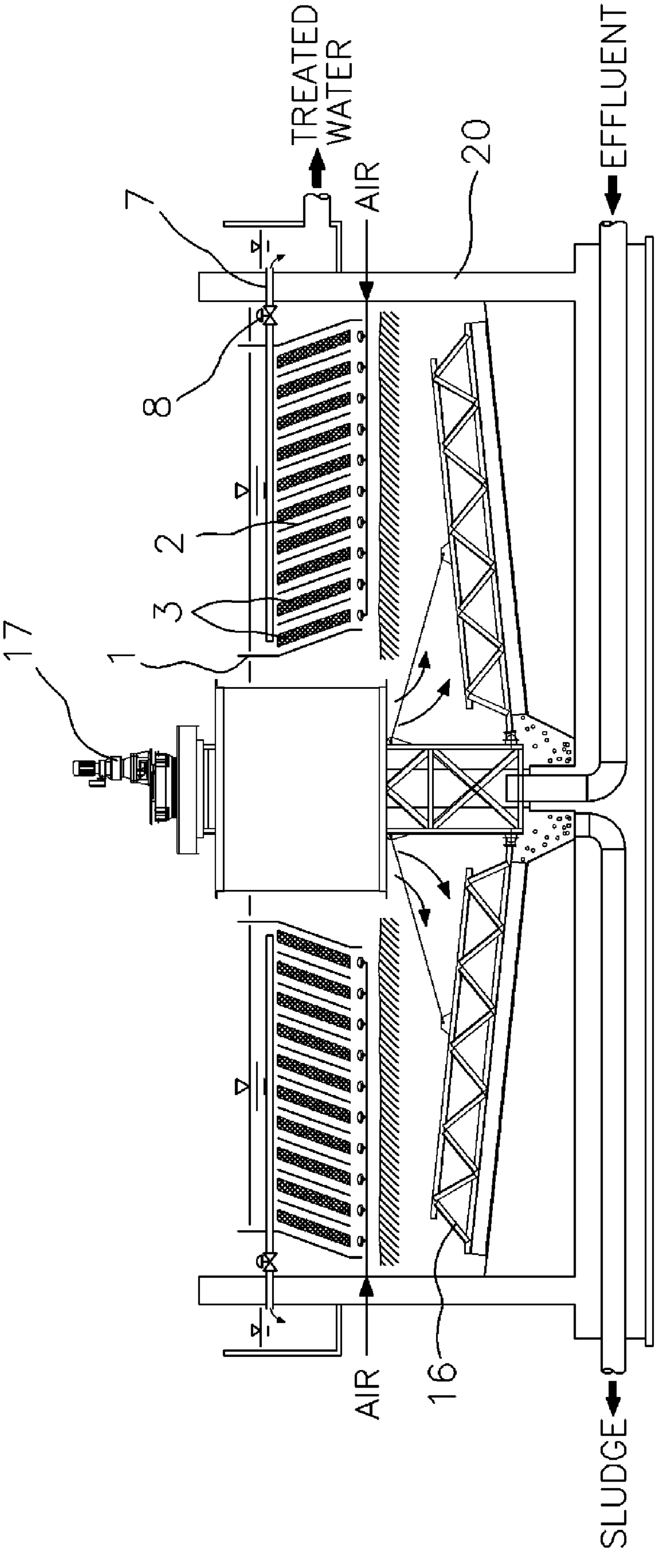
FIG. 4 is a conceptual drawing of a water treatment facility according to a first embodiment of the present invention.

FIG. 4 is a conceptual drawing of a water treatment facility using a biofilter unit according to a first embodiment of the present invention.

Referring to FIG. 4, one or more biofilter units (1) comprised of a biofilm contact and inclined plate precipitation functions are disposed at a settling chamber (20) having a relatively large capacity, where effluent of the settling chamber (20) is so constructed as to be discharged outside via the biofilter unit (1), and an clarified effluent outlet of the biofilter unit (1) is equipped with passage adjusting means (8) for preventing the treated water from being discharged outside of the settling chamber (20) or shutting off the discharge of the treated water. The biofilter unit (1) is disposed with wastewater treatment facility equipped with de-filming means for separating the solids by applying shearing force to biofilms attached and grown on the fixed biofilm media and solids deposited on surfaces of the inclination plates, where the clarified effluent outlet (7) is disposed with the passage adjusting means (8) so that the clarified effluent outlet (7) of the biofilter unit (1) on which the de-filming means is operated is tightly closed to prevent the treated water from being contaminated by the solids.

Although the biofilter unit (1) is disposed at an upper inner side of the settling chamber (20) equipped with a driving unit (17) and a sludge collecting unit (16) in the present embodiment, the biofilter unit (10) is not limited to the settling chamber but may be limitlessly applied to a reactor of a relatively large capacity.

Figure 5:
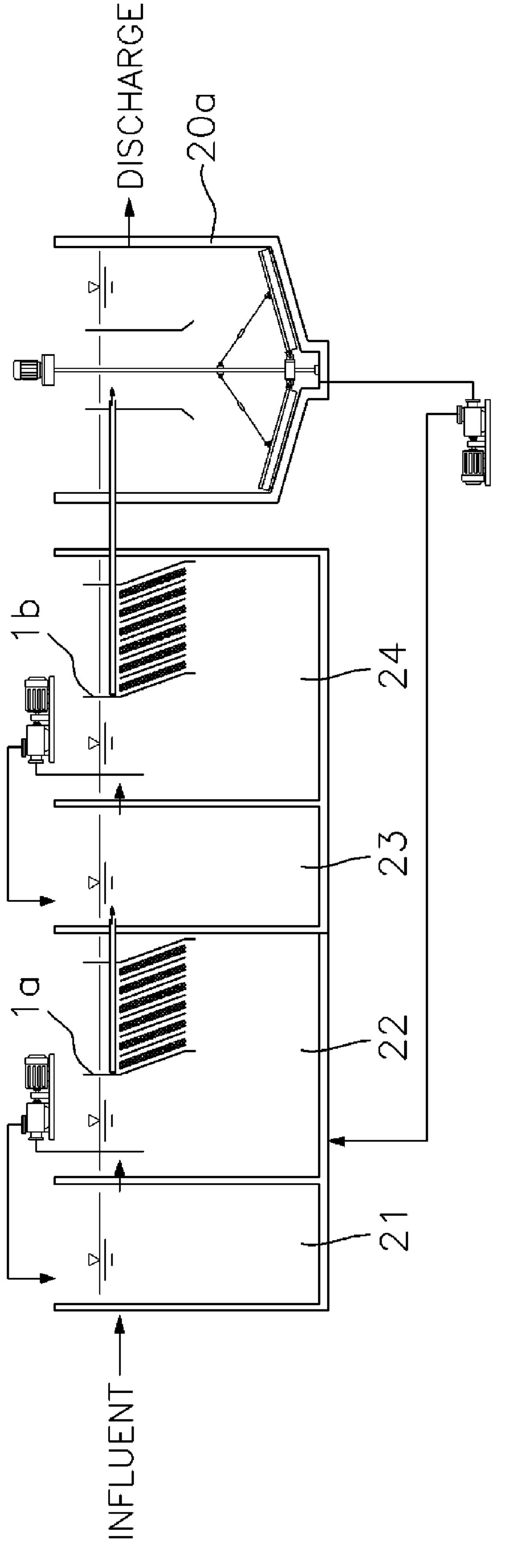
FIG. 5 is a conceptual drawing of a water treatment facility according to a second embodiment of the present invention.

FIG. 5 is a conceptual drawing of a water treatment facility using a biofilter unit according to a second embodiment of the present invention.

A final reactor (24) disposed at a pre-stage of a settling chamber (20*a*) out of reactors (21, 22, 23, 24) of a wastewater treatment facility comprised of one or more reactors and settling chambers is mounted with a biofilter unit (1*b*) of the present invention.

The effluent in the reactor (24) on which the biofilter unit (1*b*) is installed is made to flow into a subsequent settling chamber (20*a*) via the biofilter unit (1*b*) to thereby enable to reduce contaminants and solids influent into the subsequent settling chamber (20*a*).

Furthermore, a pre-stage reactor (22) out of reactors (21, 22, 23, 24) of a wastewater treatment facility comprised of one or more reactors and settling chambers is mounted with a biofilter unit (1*a*), and effluent of the reactor (22) disposed with the biofilter unit (1*a*) is made to flow into the subsequent reactor (23) to thereby enable to reduce contaminants and solids influent into the subsequent settling chamber (23).

Although the present embodiment has exemplified a wastewater treatment facility composed of an improved University of Cape Town (UCT) process, the embodiment is not limited thereto but may be applied to various types of wastewater treatment processes including, but are not limited to, the standard activated sludge nutrient removal process, the oxidation ditch process, the A2O process, a modified phostrip method, the Bardenpho process, the MLE Activated Sludge Process (Modified Ludzac-Ettinger Process), and the like to thereby enable to reduce contaminants and solids influent into the subsequent settling chamber (23).

Figure 6:
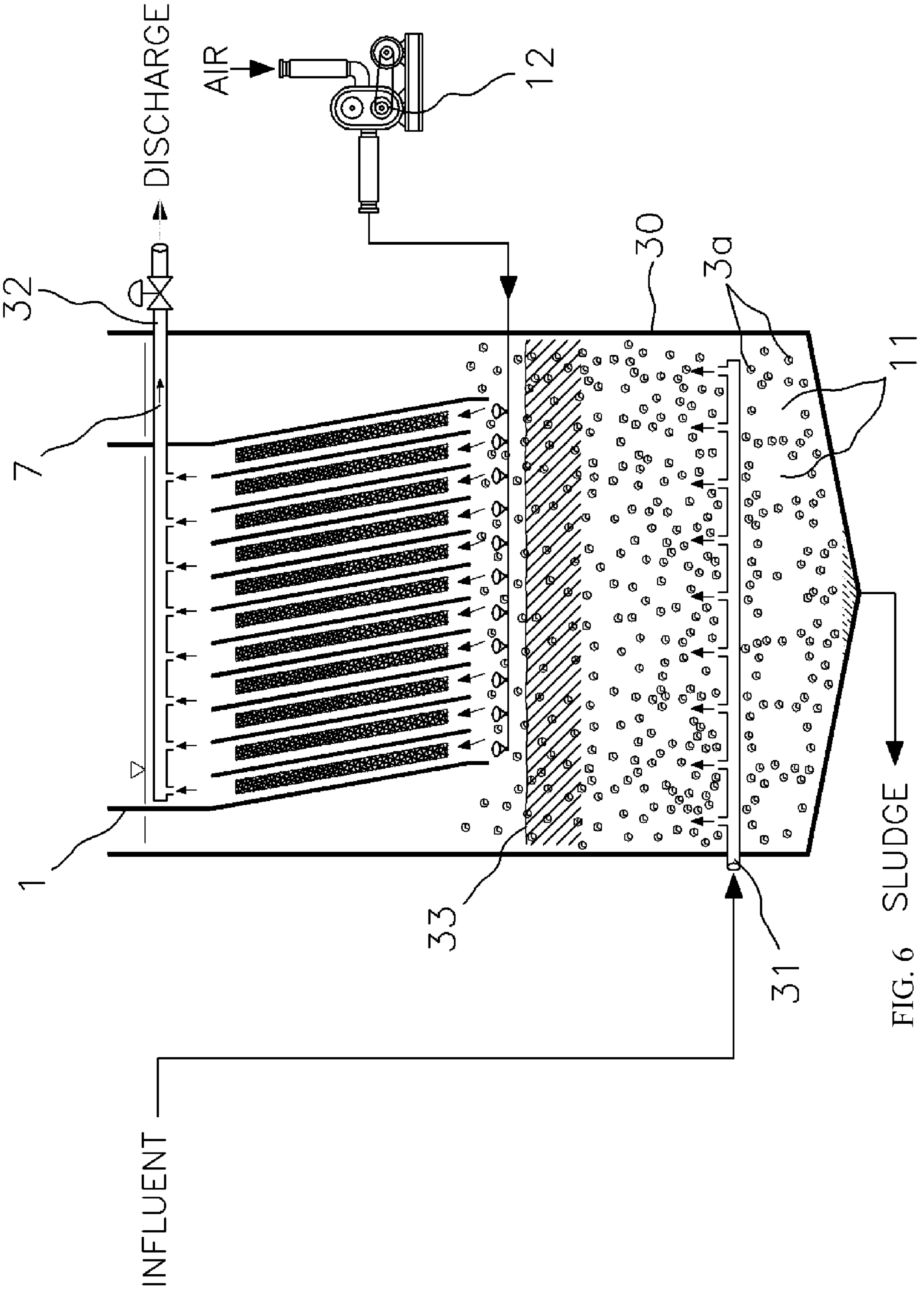
FIG. 6 is a conceptual drawing of a water treatment facility according to a third embodiment of the present invention.

FIG. 6 is a conceptual drawing of a water treatment facility using a biofilter unit according to a third embodiment of the present invention.

The third embodiment relates to a wastewater treatment facility, wherein a reactor (30) comprised of an influent water inlet (31) and a clarified effluent outlet (32) is disposed with a biofilter unit (1) of the present invention, and a biological reaction can occur by sludge blankets (33) formed by suspending micro-organisms in a lower spacing of the biofilter unit (1) or by grown and attached micro-organisms.

The reactor (30) is an agglomeration reactor where chemical agglomeration reactions occur. The reactor (30) is formed thereunder with a sludge blanket (33) by flocculent aggregates to enhance the collection efficiency of solids, and may be formed thereon with the biofilter unit (1) to add biological treatment function by biofilms and separating function of solids by inclined plates.

The reactor (30) is disposed thereunder with the biofilm media (3*a*) to simultaneously generate the attachment growth and suspension growth of micro-organisms, where the biofilm media (3*a*) comprises at least one or more of fixed biofilm media such as porous resin mats so expanded as to allow voids to communicate therebetween, fiber-interwined sponge-like meshy mats, porous ceramic materials, porous activated carbon materials, weavings formed with cilia on at least one surface thereof or non-woven fabrics and suspended microorganism contact materials having lots of densely-woven fabric or ring-shaped cotton protrusions on ropes, and the fluidized biofilm media such as synthetic resin formations, expanded resins, granular activated carbons, granular porous ceramics and fine thread balls formed by lints or fine threads.

Particularly, a plurality of plated fixed biofilm media is disposed in parallel or in lattice to allow sludge blankets to stably form in spacing between plurally-divided plated media of smaller cross sections

INDUSTRIAL APPLICABILITY

While the invention has been described in connection with a specific illustrative embodiment thereof, it will be understood that it is capable of further modifications and this application is intended to cover any variations, uses, or alterations of the invention. In general, the principles of the invention and including such departures from the present disclosure as come within known or customary practice within the art to which the invention pertains and as may be applied to the essential features hereinbefore set forth and as follows in the scope of the appended claims.

Although making and using various embodiments of the present invention have been discussed in detail above, it will be appreciated that the present invention provides many applicable inventive concepts that can be embodied in a wide variety of specific contexts. Various other changes, omissions and additions in the form and detail of the present invention may be made therein without departing from the spirit and scope of the invention. The specific embodiments discussed herein are merely illustrative of specific ways to make and use the invention, and do not delimit the scope of the invention. Therefore, the above description should not be construed as limiting, but merely as exemplification of the various embodiments.

The invention claimed is:

1. A biofilter unit filled with water comprising an inclined plate settler formed with a plurality of inclined plates, wherein each inclined plate is spaced at a predetermined distance apart and disposed in parallel and at a predetermined downward angle relative to the surface of the water in the biofilter unit; and biofilm media comprising specific surface-increased and bio-affinity materials for micro-organisms, positioned in the spaces between the inclined plates, for biofilms to attach to and grow thereon.

2. The biofilter unit as claimed in claim 1, wherein the biofilter unit also comprises de-filming means for separating solids from the inclined plates and the biofilm media by applying a shearing force to the biofilms attached to and grown on the biofilm media, and solids deposited on the surfaces of the inclined plates; wherein the de-filming means comprises at least one agitator for generating agitating water currents, a combination unit of diffusers for ejecting air bubbles and a blower, a combination unit of an ejector for ejecting water currents and air bubbles at the same time and a pump, and an ultrasonic oscillator for generating ultrasonic waves.

3. The biofilter unit as claimed in claim 1, wherein the biofilm media comprises at least one fixed biofilm media selected from the group consisting of porous resin mats, fiber-interwined sponge-like meshy mats, porous ceramic materials, porous activated carbon materials, weavings formed with cilia on at least one surface thereof, non-woven fabrics and suspended microorganism contact materials with densely-woven fabric or ring-shaped cotton protrusions on ropes; and/or at least one fluidized biofilm media selected from the group consisting of synthetic resin formations, expanded resins, granular activated carbons, granular porous ceramics and fine thread balls.

4. The biofilter unit as claimed in claim 1, wherein one side of the inclined plates has a smooth surface, and the other side of the inclined plates is contacted with porous biofilm media for micro-organisms to attach to and grow thereon.

5. A water treatment facility including a biofilter unit filled with water comprising an inclined plate settler formed with a plurality of inclined plates, wherein each inclined plate is spaced at a predetermined distance apart and disposed in parallel and at a predetermined downward angle relative to the surface of the water in the biofilter unit; and biofilm media comprising specific surface-increased and bio-affinity materials for micro-organisms, positioned in the spaces between the inclined plates, for biofilms to attach to and grow thereon, wherein at least one or more biofilter units are disposed in a reactor or a settling chamber of relatively large capacity, and effluent of the reactor or the settling chamber is discharged to the outside via the biofilter unit and a clarified effluent outlet; de-filming means for separating biofilms and solids by applying a shearing force to the biofilm media and the inclined plates, and the clarified effluent outlet of the biofilter unit is equipped with passage adjusting means for preventing the treated water from being discharged outside the settling chamber or shutting off the discharge of the treated water so that the clarified effluent outlet of the biofilter unit is closed to prevent the treated water from being contaminated by the solids.

6. The water treatment facility as claimed in claim 5, wherein at least one or more of the biofilter units are disposed in at least one or more reactors in a wastewater treatment facility comprised of one or more reactors and a settling chamber, and a clarified effluent conduit of the biofilter units communicates with a subsequent reactor or a settling chamber so that the effluent of the biofilter units can flow into the subsequent reactor or the settling chamber.

7. The water treatment facility as claimed in claim 5, wherein one or more biofilter units are disposed at an upper surface of a reactor comprising an influent water inlet and a clarified effluent outlet and wherein physiochemical or biological reaction occurs, and a clarified effluent conduit of the biofilter unit communicates with the clarified effluent outlet of the reactor so that effluent of the biofilter unit can be discharged to the outside via the clarified effluent outlet.

8. The water treatment facility as claimed in claim 7, wherein the biofilm media comprises at least one fixed biofilm media selected from the group consisting of porous resin mats, fiber-interwined sponge-like meshy mats, porous ceramic materials, porous activated carbon materials, weavings formed with cilia on at least one surface thereof, non-woven fabrics and suspended microorganism contact materials with densely-woven fabric or ring-shaped cotton protrusions on ropes, and/or at least one fluidized biofilm media selected from the group consisting of synthetic resin formations, expanded resins, granular activated carbons, granular porous ceramics and fine thread balls, so that voids can be communicated and attachment growth and suspension growth of micro-organisms can simultaneously occur.

* * * * *